(12) United States Patent
Warwel

(10) Patent No.: US 11,472,276 B2
(45) Date of Patent: Oct. 18, 2022

(54) METHOD AND DEVICE FOR DETERMINING THE FLOW DIRECTION OF A COOLANT

(71) Applicant: Robert Bosch GmbH, Stuttgart (DE)

(72) Inventor: Manuel Warwel, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 16/095,407

(22) PCT Filed: Mar. 23, 2017

(86) PCT No.: PCT/EP2017/056941
§ 371 (c)(1),
(2) Date: Oct. 22, 2018

(87) PCT Pub. No.: WO2017/182226
PCT Pub. Date: Oct. 26, 2017

(65) Prior Publication Data
US 2019/0135099 A1 May 9, 2019

(30) Foreign Application Priority Data
Apr. 22, 2016 (DE) ..................... 10 2016 206 836.9

(51) Int. Cl.
*B60K 1/00* (2006.01)
*F01P 7/04* (2006.01)
(Continued)

(52) U.S. Cl.
CPC ............... *B60K 1/00* (2013.01); *B60K 11/02* (2013.01); *F01P 7/048* (2013.01); *F01P 11/16* (2013.01);
(Continued)

(58) Field of Classification Search
CPC .. B60K 11/02; B60K 11/00; B60K 2001/006; F01P 7/048; F01P 11/16; F01P 2025/08
See application file for complete search history.

(56) References Cited

U.S. PATENT DOCUMENTS 9,072,321 B2 * 7/2015 Liu ....................... A24F 47/008
2004/0137313 A1 * 7/2004 Jaura ................. H01M 10/6565
429/62
(Continued)

FOREIGN PATENT DOCUMENTS

CN 1587922 A 3/2005
CN 103429445 A 12/2013
(Continued)

OTHER PUBLICATIONS

Takechui, Flow sensor and manufacture thereof, May 2000, Full Document (Year: 2000).*
(Continued)

*Primary Examiner* — Nael N Babaa
(74) *Attorney, Agent, or Firm* — Michael Best & Friedrich LLP

(57) ABSTRACT

The invention relates to a method (100) for determining the flow direction (R) of a coolant (M). The coolant (M) flows past at least two adjacent components (K1, K2) one after the other in order to cool the components (K1, K2). The method has the following steps: ascertaining a first temperature (110) which is paired with the first component (K1) of the at least two adjacent components; ascertaining a second temperature (115) which is paired with the second component (K2) of the at least two adjacent components; ascertaining the difference (120) between the ascertained temperatures; and determining the flow direction (190) of the coolant on the basis of the ascertained difference.

20 Claims, 2 Drawing Sheets

(51) Int. Cl.
*F01P 11/16* (2006.01)
*B60K 11/02* (2006.01)

(52) U.S. Cl.
CPC ..... *B60K 2001/006* (2013.01); *F01P 2025/08* (2013.01)

(56) References Cited

U.S. PATENT DOCUMENTS

2005/0026169 A1* 2/2005 Cargill ................ C12Q 1/6883
  435/6.14
2007/0271943 A1* 11/2007 Baruschke ......... B60H 1/00907
  62/324.6

FOREIGN PATENT DOCUMENTS

| CN | 103477432 A | | 12/2013 | |
|---|---|---|---|---|
| DE | 10356443 | | 7/2005 | |
| JP | 2000146656 | | 5/2000 | |
| JP | 2000146656 A | * | 5/2000 | |
| NO | 2014193297 | | 12/2014 | |
| WO | WO-2014193297 A1 | * | 12/2014 | ............... H02K 5/00 |

OTHER PUBLICATIONS

International Search Report for Application No. PCT/EP2017/056941 dated Jun. 19, 2017 (English Translation, 2 pages).

* cited by examiner

METHOD AND DEVICE FOR DETERMINING THE FLOW DIRECTION OF A COOLANT

BACKGROUND OF THE INVENTION

The invention relates to a method and a device for determining the direction of flow of a coolant. The invention further relates to a drive train with a corresponding device, and to a vehicle with a drive train.

The cooling of electrical and other components with a coolant—for instance, with a cooling liquid or a stream of gas—is known from the prior art. In the case of several components to be cooled, these are arranged in succession. For the purpose of cooling the components, the coolant flows past them in succession. In the process, heat is withdrawn from the components to be cooled and is taken up by the coolant. In this arrangement, the components arranged at the foremost point are cooled with a greater cooling capacity than the components arranged at a later point, since the temperature difference between the components to be cooled and the coolant becomes smaller by reason of the warming of the coolant in the direction of the direction of flow of the coolant along the arranged components. In such a cooling section or in a cooling circuit, therefore, the components that are cooled more intensely are arranged at the beginning of the cooling circuit, and components that are cooled less intensely are arranged in the direction of the end of the cooling section or of the cooling circuit. For faultless operation of the components and of the cooling circuit, it is necessary that the direction of flow of the coolant is oriented from the components to be cooled more intensely in the direction of the components to be cooled less intensely. There is therefore a need for methods and devices for determining the direction of flow of a coolant.

SUMMARY OF THE INVENTION

A method is provided for ascertaining a direction of flow of a coolant, wherein for the purpose of cooling at least two juxtaposed components the coolant flows past these components in succession. The method comprises the following steps: ascertaining a first temperature which is assigned to the first component of the at least two juxtaposed components; ascertaining a second temperature which is assigned to the second component of the at least two juxtaposed components; ascertaining a difference of the ascertained temperatures; determining the direction of flow of the coolant as a function of the ascertained difference.

A method is provided for determining the direction of flow of a coolant. The coolant—in particular, a cooling liquid or a stream of gas—is guided past or flows past two components of a cooling section or within a cooling circuit which are arranged side by side or in succession. The method includes the ascertaining of at least two temperatures, one of which is respectively assigned to one of the at least two juxtaposed components. This means that the temperatures of the at least two arranged components are ascertained, for instance, by the temperatures of the individual components being measured directly on the component or, for instance, being measured indirectly in the vicinity of the component, for instance on a carrier structure or on a radiator structure. Alternatively, the measurement of a coolant temperature is also possible, for instance in the vicinity of or below the components, possible for the purpose of ascertaining a temperature that is assigned to a component. The ascertainment may also include a calculation of a temperature on the basis of a heat-transfer model for the most accurate possible determination of the temperature of a component. In addition, the difference of the ascertained temperatures is ascertained and, depending on the difference of the temperatures, the direction of flow of the coolant is determined or established. The direction of flow is determined on the basis of the temperature gradient of the coolant by reason of the temperatures measured on the components. Advantageously, a method is provided for determining the direction of flow of a coolant, wherein no impairment of the cooling circuit is necessary for this purpose.

In another configuration of the invention, a designated direction of flow has been predetermined. In addition, the method includes the following additional step: initiating safeguarding measures in the course of determining the direction of flow in a direction that does not coincide with the designated direction of flow.

A designated direction of flow has been predetermined. This direction is oriented in such a manner that the components to be cooled more intensely are cooled by the not yet warmed coolant. The components to be cooled less intensely are arranged at downstream locations or toward the end of the cooling circuit. These components are cooled correspondingly less by the already warmed coolant. The method includes the additional step of the initiating of safeguarding measures in the case where a direction that does not coincide with the designated direction of flow is determined as direction of flow. Advantageously, a method is consequently provided that enables a safe operation of the components to be cooled. In the case where the direction of flow of the coolant does not coincide with the designated direction of flow, the possibility for safeguarding the system is provided.

In another configuration of the invention, the initiating of safeguarding measures includes at least one of the following steps: sending a fault signal, and/or at least reduced-power operation of at least one component, or shutting down at least one component.

Diverse safeguarding measures are possible for protecting the components and the cooling system. In particular, a safeguarding measure that presents itself is to output a fault signal which is detected by a corresponding receiver for the purpose of carrying out further measures. Alternatively or additionally, an at least reduced-power operation of at least one component, or a shutdown of at least one component, is also provided. By the "shutdown" of at least one component, it is to be understood here that this component is taken out of operation or is no longer operated actively, so that this component can no longer generate any losses, and consequently a further warming by this component itself is also avoided. Advantageously, various safeguarding measures are provided for protecting the components and the cooling circuit.

In another configuration of the invention, the components interact in a system. The system itself has an operating frequency. The method includes the following further steps: ascertaining the operating frequency; determining the direction of flow of the coolant as a function of the ascertained operating frequency.

The components are parts of a system that has an operating frequency. This operating frequency is ascertained, and the direction of flow of the coolant is determined as a function of this operating frequency. Consequently an improved method for determining the direction of flow of a coolant is advantageously provided, wherein a further operating parameter of the system is taken into consideration.

In a further configuration of the invention, the determination of the direction of flow does not occur if the ascertained operating frequency is lower than a predeterminable minimum operating frequency.

As long as the operating frequency is lower than a minimum operating frequency, it cannot be ensured that the components are actually being operated, or a sufficiently great warming is taking place which is the basis for the determination of the direction of flow on the basis of the temperatures of the components. In such a case, the determination of the direction of flow may be erroneous, since the gradient of the temperature of the coolant between the components possibly does not correlate with the direction of flow. According to this configuration, a determination of the direction of flow occurs only when the ascertained operating frequency is high enough—that is to say, higher than a predeterminable minimum operating frequency. Advantageously, an improved method is provided for more secure determination of the direction of flow, in which the operating frequency is taken into consideration.

In another configuration of the invention, the system is an electric drive system, and one of the components is an electric machine. The operating frequency is the electrical frequency of the electric machine. Additionally or alternatively, the system includes an electrical converter, and one of the components includes a power module with at least one switching element. In this case, the operating frequency may be the frequency of modulation of the switching element.

The components are, for instance, an electric machine or power modules through which high electric currents flow at high electric voltages. With increasing operating frequency, dissipated heat increasingly arises, which is taken up by the coolant and results in the warming of the coolant. Advantageously, a method is provided in which the components of the system include an electric machine or a power module.

In another configuration of the invention, the components exhibit a dissipated power in operation. The method includes the following further steps: ascertaining the dissipated power of at least one component; determining the direction of flow of the coolant as a function of the ascertained dissipated power.

During operation, the components exhibit a dissipated power. This means that the components warm up during operation by reason of the emitted dissipated power. This dissipated power is ascertained and taken into consideration in the course of the determination of the direction of flow of the coolant.

Advantageously, an improved method is provided for determining the direction of flow of a coolant.

In another configuration of the invention, the determination of the direction of flow does not occur if the ascertained dissipated power is less than a predeterminable minimum dissipated power.

As long as the dissipated power of at least one component is less than a minimum dissipated power, it cannot be ensured that the components are actually being operated, or a sufficiently great warming is taking place which is the basis for the determination of the direction of flow on the basis of the temperatures of the components. In such a case, the determination of the direction of flow may be erroneous, since the gradient of the temperature of the coolant between the components possibly does not correlate with the direction of flow. Advantageously, an improved method is provided for more secure determination of the direction of flow, in which the dissipated power of at least one component is taken into consideration.

In another configuration of the invention, the components are flowed through by electric current at least temporarily.

The components are components that are flowed through by electric current at least partially and temporarily. According to this configuration, it is accordingly not a question of purely mechanical components to be cooled. Advantageously, a method is provided for determining the direction of flow of a coolant that cools electrical components at least partially.

In another configuration of the invention, the components are power modules with switching elements of a converter, in particular of an inverter or DC/DC converter, or cells of a battery with serial cooling of the cells. Alternatively, the components may also include an electric machine.

The components are, for instance, power modules—that is to say, electrical modules that exhibit switching elements, in particular semiconductor switches. These power modules are driven by low currents and voltages. However, the switching elements themselves switch high electric powers, currents and/or voltages. In the course of the conduction and switching of this high electrical energy, dissipated heat arises which is taken up by the coolant and results in the warming of the coolant. Analogously, an electric machine also warms up in operation, or the cells of a battery also warm up in the course of discharging and charging of the battery. Advantageously, a method is provided in which the components take the form of power modules or cells of a battery, or the components include an electric machine.

The invention further relates to a computer program that has been set up to carry out the previously described methods.

The invention further encompasses a machine-readable storage medium on which the described computer program has been stored.

The invention further encompasses a device for determining the direction of flow of a coolant. For the purpose of cooling at least two juxtaposed components, the coolant here flows past these components in succession. In addition, the device includes a logic unit which has been set up to carry out the previously described methods for determining the direction of flow of a coolant. For this purpose, the logic unit receives temperature signals from corresponding sensor units assigned to the components, ascertains the difference between the communicated temperatures, and determines the direction of flow of the coolant. Advantageously, a device is consequently provided that has been set up in such a manner that the previously described methods for determining the direction of flow of a coolant can be carried out.

The invention further encompasses a drive train with a described device. A drive train of such a type serves, for instance, for the drive of an electric vehicle. In particular, said drive train includes an energy source or battery, a DC/DC converter, a pulse inverter, and/or an electric machine capable of being connected thereto. By means of the method and the device, a safe operation of the drive train is made possible.

The invention further encompasses a vehicle with a described drive train. Advantageously, a vehicle is consequently provided that includes a device with which the direction of flow of a coolant can be determined.

It will be understood that the features, properties and advantages of the method according to the invention apply, or are applicable, in a corresponding manner, to the device or the drive train and to the vehicle, and conversely.

Further features and advantages of embodiments of the invention will become apparent from the following description with reference to the appended drawings.

BRIEF DESCRIPTION OF THE DRAWING

In the following the invention will be elucidated in more detail on the basis of some figures, in which there are shown.

DETAILED DESCRIPTION

Figure 1:
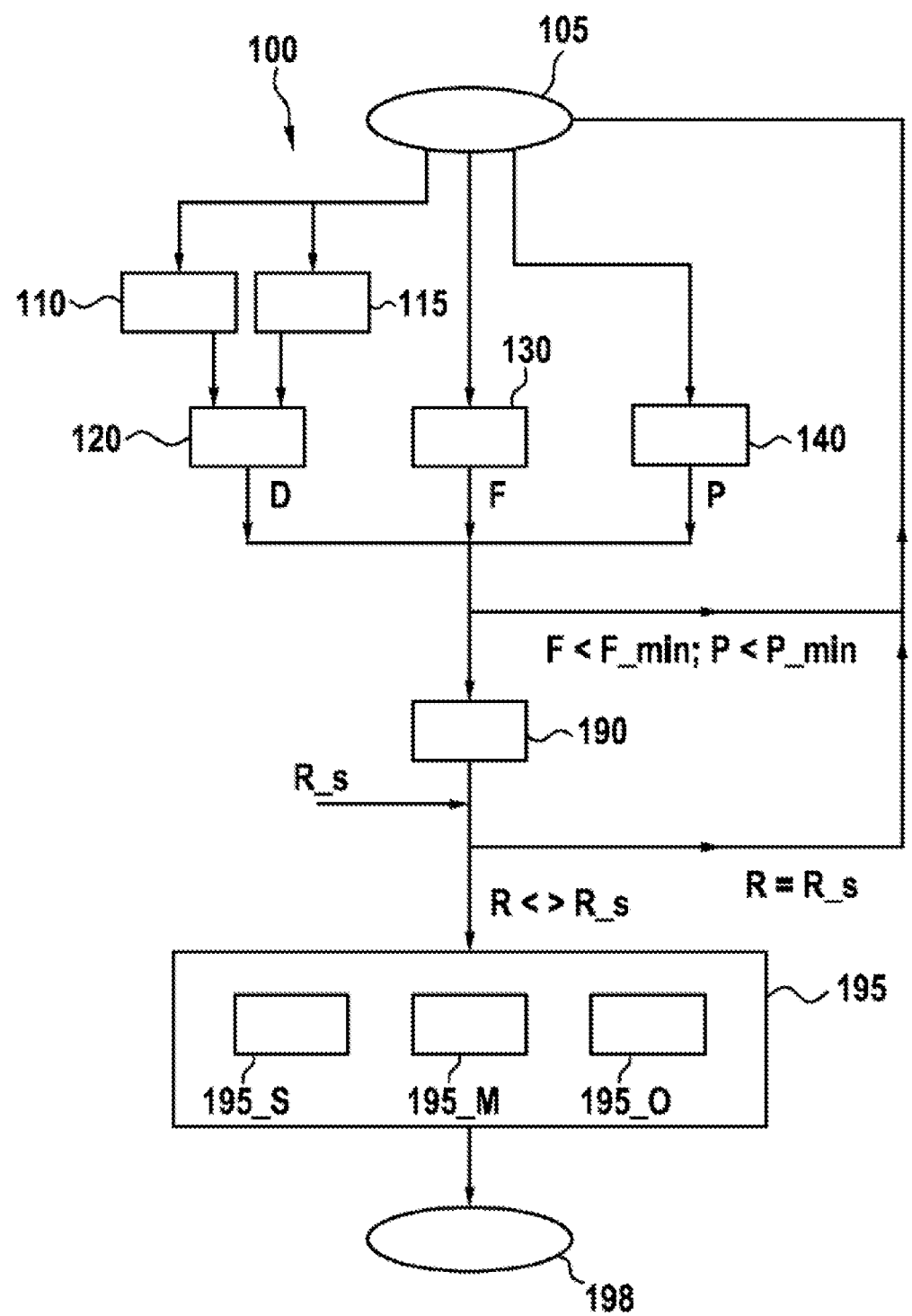
FIG. 1 a method for determining the direction of flow of a coolant.

FIG. 1 shows a method 100 for determining the flow direction R of a coolant M. The method begins with step 105. In step 110, a first temperature is ascertained which is assigned to a first component K1; in step 115, a second temperature is ascertained which is assigned to a second component K2. The first component K1 and the second component K2 are arranged side by side or in succession in the sense that a coolant M flowing past them firstly flows past the first component K1 and, at a later point in time, past component K2. Further components K_n are also conceivable, past which the coolant M flows. In further steps, the temperatures of the further components could also be ascertained. The ascertainment of the temperatures of the individual components occurs substantially simultaneously, so that a comparison of the temperatures of the components from one point in time is possible. In step 120, the difference D of the ascertained temperatures is ascertained. This difference D is a measure of the temperature gradient of the coolant from a first to a second component or from the further components to one another. In a step 130 occurring temporally in parallel with the measurement of the temperatures, the ascertainment of an operating frequency F of the system 200—to which the components K1, K2 also belong—can occur. In addition, temporally in parallel with this, a dissipated power P of at least one of the components K1, K2 can be ascertained in step 140. In the case where an operating frequency F or also a dissipated power P is ascertained, there is the possibility of not carrying out a determination of the direction of flow of a coolant if the operating frequency F is less than a minimum operating frequency F_min or if the dissipated power P is less than a minimum dissipated power P_min. In this case, the program branches back to step 105. If the operating frequency F is greater than the minimum value and/or if the dissipated power is greater than the minimum value, in step 190 the flow direction R of the coolant is determined as a function of the ascertained temperature difference D and, if available, as a function of the operating frequency F and the dissipated power P. The direction of flow is determined as a function of the difference D of the temperatures of the components K1, K2 in the direction of the warmer component K1, K2. In the case where the operating frequency F or the dissipated power P is lower than the respective predetermined minimum value F_min or P_min, no determination of the direction of flow occurs, since possibly no difference D of the temperatures has arisen that correlates with the flow direction R of the coolant M. A designated flow direction R_s is predetermined for the method. If the determined flow direction R coincides with the predetermined flow direction R_s, the method branches back to step 105 for renewed starting of the method. If the determined flow direction R is not the same as the predetermined flow direction R_s, safeguarding measures are initiated with step 195. These safeguarding measures include, for instance, the sending of a fault signal in step 195_S to a corresponding receiver, for instance a display for a user, or a control unit. An additional or alternative safeguarding measure is, for instance, implemented in step 195_M. For the further operation of the components K1, K2, a reduced-power operation of at least one of the components K1, K2 is provided. Another alternative would be a shutdown of at least one of the components K1, K2 in step 195_O. In addition to these described safeguarding measures 195_x, others are also conceivable that have the result that a further warming of the system 200 is avoided. The method terminates with step 198.

Figure 2:
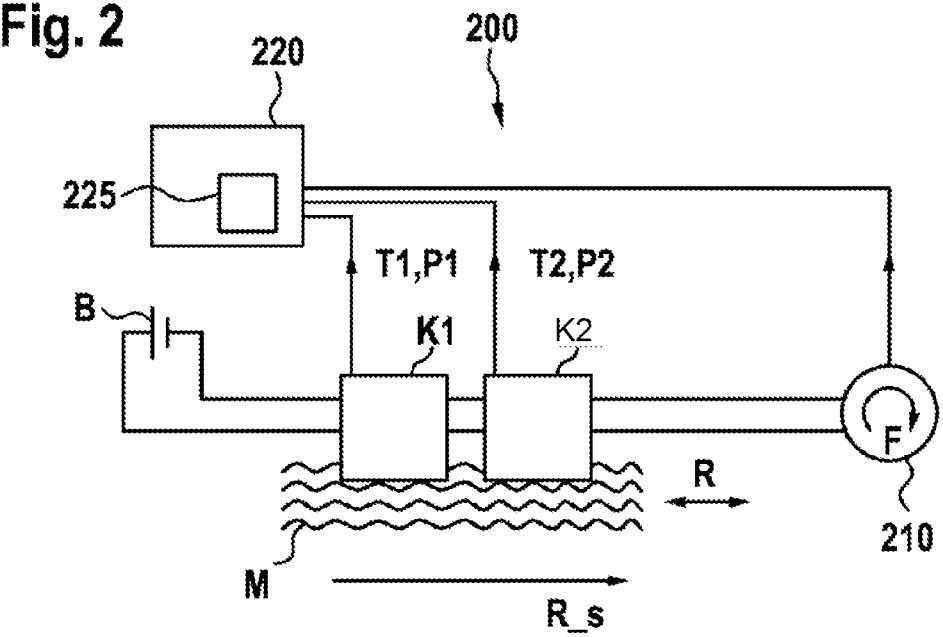
FIG. 2 a schematically represented system to be cooled.

FIG. 2 shows a system 200, for instance an electric drive system with an electric machine 210 which is operated at an operating frequency F. The electric machine is supplied with energy from a battery B. The electrical energy from the battery B is conducted across two components K1 and K2 and led onward to the electric machine 210. The two electrical components K1 and K2 serve, for instance, for the conversion of a DC voltage of the battery B into an AC voltage for supplying the electric machine 210. For this purpose the components K1 and K2 exhibit switching elements, for instance, in order to lead a flow of current from an input to an output of component K1 or K2. The components K1 and K2 are flowed around at least partially by a coolant M, in the course of which the medium firstly flows past component K1 and a component K2 in accordance with a preferential direction R_s. The medium flows along the components K1 and K2 in the flow direction R. In addition, a device 220 is provided that includes a logic unit 225. The temperatures T1, T2 of the component K1 and K2 are ascertained and transmitted to the device 220. Where appropriate, the dissipated powers P1, P2 of the two components K1, K2 and/or the operating frequency F of the electrical system 200 or, in particular, of the electric machine 210 is/are also transmitted to the device 220. In the device 220 with the logic unit 225 the ascertained data are captured and the method as described above is carried out, so that the current flow direction R is determined. In the case where R coincides with the predetermined flow direction R_s, the method is repeated again. In the case where the determined flow direction R does not coincide with the predetermined flow direction R_s, the stated safeguarding measures are initiated. Consequently a safe operation of the system is made possible.

Figure 3:
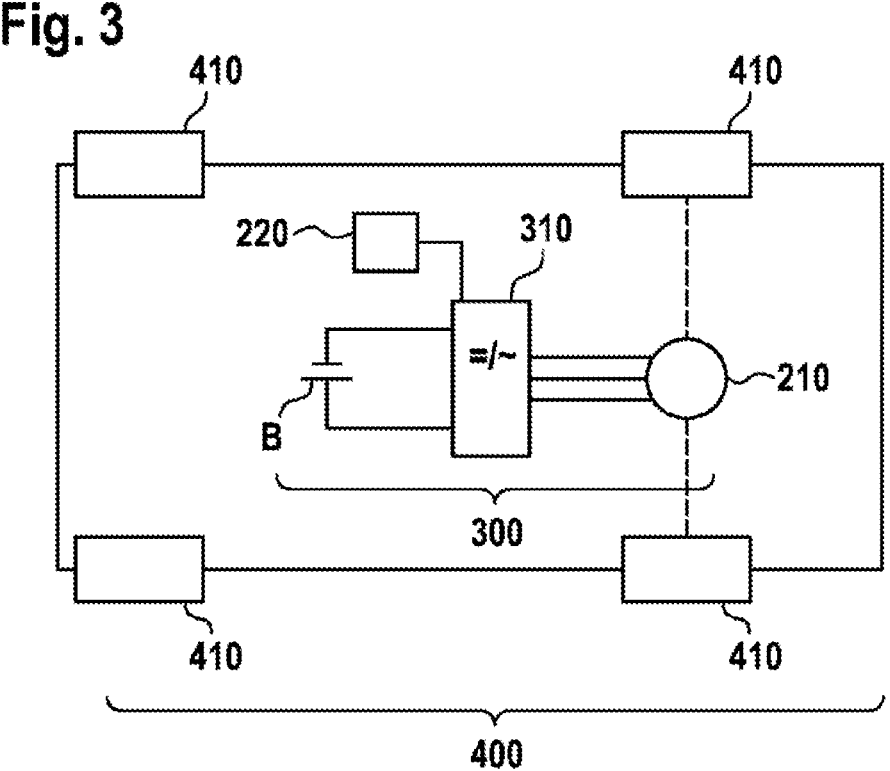
FIG. 3 a schematically represented vehicle with a drive train.

FIG. 3 shows a drive train 300 which, once again, includes a battery B for supplying an electric machine 210. An inverter 310 converts the electrical energy of the battery B into an AC voltage for supplying the electric machine 210. The device 220 serves for driving the inverter 310 which, in turn, includes the components K1 and K2 which are cooled by the coolant M. Regardless of the chosen representation, the device 220 may also have been arranged, for instance, within the inverter 310. The device 220 has been set up to implement the described methods. In addition, FIG. 3 shows a schematically represented vehicle 400 with four wheels 410, said vehicle including a drive train 300 with a device 220.

What is claimed is:

1. A system (200) comprising a cooling circuit including first and second juxtaposed components (K1, K2) and a coolant (M) that flows in a single designated direction during proper operation of the system, wherein the coolant flows past first and second juxtaposed components (K1, K2) in succession, and the system (200) also comprising a control unit configured to implement the following steps:

(a) ascertaining a first temperature (110) of the first component (K1);

(b) ascertaining a second temperature (115) of the second component (K2);
(c) ascertaining a difference (120) of the first and second temperatures (110, 115);
(d) determining a determined flow direction (190, R) of the coolant (M) as a function of the difference (120); and
(e) when the determined flow direction (R) determined in step (d) does not coincide with the designated flow direction (R_S), initiating safeguarding measures (195).

2. The system (200) as claimed in claim 1,
wherein the initiating of safeguarding measures (195) comprises at least one of the following steps:
sending a fault signal (195_S); and/or
at least reduced-power operation of at least one of the first and second juxtaposed components (195_M)
or shutting down at least one component (195_0).

3. The system (200) as claimed in claim 1,
wherein the system (200) has an operating frequency (F) with the following additional steps:
ascertaining the operating frequency (130) of the system (200); and
determining the flow direction (190) of the coolant as a function of the ascertained operating frequency (F).

4. The system (200) as claimed in claim 3,
wherein a determination of the flow direction (190) does not occur if the ascertained operating frequency (F) is lower than a predeterminable minimum operating frequency (F_min).

5. The system (200) as claimed in claim 3,
wherein the system (200) is an electric drive system, and one of the first and second components (K1, K2) is an electric machine (210), and the operating frequency (F) is the electrical frequency of the electric machine (210)
or wherein the system (200) includes an electrical converter, and one of the of the first and second juxtaposed components (K1, K2) is a power module with at least one switch, and the operating frequency (F) is the frequency of modulation of the switch.

6. The system (200) as claimed in claim 1,
wherein the first and second components (K1, K2) exhibit a dissipated power (P) in operation,
with the following additional steps:
ascertaining the dissipated power (140) of the first and second juxtaposed components (K1, K2); and
determining the flow direction (190) of the coolant as a function of the ascertained dissipated power (P).

7. The system (200) as claimed in claim 6,
wherein a determination of the flow direction (190) does not occur if the ascertained dissipated power (P) is less than a predeterminable minimum dissipated power (P_min).

8. The system (200) as claimed in claim 6,
wherein one of the first and second juxtaposed components (K1, K2) includes at least one power module with a switch of a converter
or wherein one of the first and second juxtaposed components (K1, K2) includes at least one electric machine (210).

9. The system (200) as claimed in claim 6, wherein at least one of the first and second juxtaposed components (K1, K2) includes at least one electric machine (210).

10. A drive train (300) with a system (200) as claimed in claim 1.

11. The system (200) as claimed in claim 3, wherein the system (200) includes an electrical converter, and one of the first and second juxtaposed components (K1, K2) is a power module with at least one switch, and the operating frequency (F) is the frequency of modulation of the switch.

12. The system (200) as claimed in claim 1,
wherein the initiating of safeguarding measures (195) comprises:
sending a fault signal (195_S).

13. The system (200) as claimed in claim 1,
wherein the initiating of safeguarding measures (195) comprises:
reduced-power operation of at least one of the first and second juxtaposed components (195_M).

14. The system (200) as claimed in claim 1,
wherein the initiating of safeguarding measures (195) comprises:
sending a fault signal (195_S); and
at least reduced-power operation of at least one of the first and second juxtaposed components (195_M).

15. The system (200) as claimed in claim 1,
wherein the initiating of safeguarding measures (195) comprises:
sending a fault signal (195_S); and
shutting down at least one component (195_0).

16. The system (200) as claimed in claim 1,
wherein the initiating of safeguarding measures (195) comprises:
shutting down at least one component (195_0).

17. A non-transitory computer readable media comprising program code to carry out a method (100) for operating a system (200) in which a coolant (M) flows in a single designated direction during proper operation of the system, wherein the coolant flows past first and second juxtaposed components (K1, K2) in succession, the first and second juxtaposed components (K1, K2) being within a cooling circuit of the system (200), the method comprising the following steps:
(a) ascertaining a first temperature (110) of the first component (K1);
(b) ascertaining a second temperature (115) of the second component (K2);
(c) ascertaining a difference (120) of the first and second temperatures (110, 115);
(d) determining a determined flow direction (190, R) of the coolant (M) as a function of the difference (120); and
(e) when the determined flow direction (R) determined in step (d) does not coincide with the designated flow direction (R_S), initiating safeguarding measures (195).

18. A vehicle (400) with a drive train (300) as claimed in claim 10.

19. A method (100) for determining a flow direction (R) of a coolant (M) in a system (200) wherein the coolant flows past first and second juxtaposed components (K1, K2) in succession, wherein the first and second juxtaposed components (K1, K2) exhibit a dissipated power (P) in operation, the method comprising the following steps:
ascertaining a first temperature (110) of the first component (K1);
ascertaining a second temperature (115) of the second component (K2);
ascertaining a difference (120) of the first and second temperatures (110, 115);
ascertaining the dissipated power (140, P) of the first and second juxtaposed components (K1, K2); and determining the flow direction (190) of the coolant as a function of the ascertained difference (120) and as a function of the ascertained dissipated power (140, P).

20. The system (200) as claimed in claim 1, wherein the control unit includes a non-transitory computer readable media comprising program code to carry out steps (a) through (e).

\* \* \* \* \*